(12) United States Patent
Park et al.

(10) Patent No.: US 8,037,207 B2
(45) Date of Patent: Oct. 11, 2011

(54) APPARATUS AND METHOD FOR SYNCHRONIZING PRESENCE ATTRIBUTE DATA BETWEEN TERMINAL AND SERVER

(75) Inventors: Jee-Hoon Park, Seoul (KR); Ho-Sub Seo, Gunpo-si (KR)

(73) Assignee: Samsung Electronics Co., Ltd (KR)

( * ) Notice: Subject to any disclaimer, the term of this patent is extended or adjusted under 35 U.S.C. 154(b) by 1150 days.

(21) Appl. No.: 10/811,546

(22) Filed: Mar. 29, 2004

(65) Prior Publication Data

US 2005/0086376 A1   Apr. 21, 2005

(30) Foreign Application Priority Data

Oct. 17, 2003   (KR) .................. 10-2003-0072645

(51) Int. Cl.
*G06F 15/16* (2006.01)
(52) U.S. Cl. ....................................... 709/248; 709/227
(58) Field of Classification Search .................. 709/248, 709/227, 228
See application file for complete search history.

(56) References Cited

U.S. PATENT DOCUMENTS

| | | | |
|---|---|---|---|
| 6,138,158 A | 10/2000 | Boyle et al. | |
| 6,480,957 B1 * | 11/2002 | Liao et al. ...................... | 713/170 |
| 7,171,473 B1 * | 1/2007 | Eftis et al. ...................... | 709/227 |
| 7,343,435 B2 * | 3/2008 | Graham ........................... | 710/62 |
| 2002/0120760 A1 * | 8/2002 | Kimchi et al. ................. | 709/230 |
| 2003/0005342 A1 | 1/2003 | Thomas et al. | |
| 2003/0037103 A1 * | 2/2003 | Salmi et al. .................... | 709/203 |
| 2003/0065788 A1 * | 4/2003 | Salomaki ........................ | 709/227 |
| 2004/0205263 A1 * | 10/2004 | Sivaraman et al. ............. | 710/21 |

FOREIGN PATENT DOCUMENTS

JP    12-083061    3/2000

* cited by examiner

*Primary Examiner* — Joseph Avellino
*Assistant Examiner* — Marshall McLeod
(74) *Attorney, Agent, or Firm* — The Farrell Law Firm, P.C.

(57) ABSTRACT

An apparatus and method for synchronizing data between a terminal and a server. The apparatus synchronizes presence attribute data when the terminal and the server are connected to each other to establish a messenger service between them. The client terminal requests presence attribute data to be updated from a server when it is reconnected to the server having been previously connected to the client terminal to perform the messenger service, and updates presence attribute data stored at a time of a previous connection upon receiving the presence attribute data to be updated from the server. The server receives a presence attribute data request to be updated from the client terminal, and transmits only updated presence attribute data, created after releasing the previous connection, from among current presence attribute data to the client terminal.

25 Claims, 5 Drawing Sheets

APPARATUS AND METHOD FOR SYNCHRONIZING PRESENCE ATTRIBUTE DATA BETWEEN TERMINAL AND SERVER

PRIORITY

This application claims priority to an application entitled "APPARATUS AND METHOD FOR SYNCHRONIZING PRESENCE ATTRIBUTE DATA BETWEEN TERMINAL AND SERVER", filed in the Korean Intellectual Property Office on Oct. 17, 2003 and assigned Ser. No. 2003-72645, the contents of which are incorporated herein by reference.

BACKGROUND OF THE INVENTION

1. Field of the Invention

The present invention relates to an apparatus and method for synchronizing data between a terminal and a server, and more particularly to an apparatus and method for synchronizing presence attribute data when the terminal and the server are connected to each other to establish a messenger service between them.

2. Description of the Related Art

Typically, if a client terminal is connected to a server to establish data communication between them, there is a need for data of the client terminal to be synchronized with that of the server. FIG. 1 shows an exemplary system for connecting the client terminal with the server. The client terminals 100, 102, and 104 are terminals for providing a messenger service, and are connected to a server 110 over the Internet 108 or a mobile communication wireless network 106. The server 110 for providing such a messenger service includes a presence attribute database (DB) 112. The presence attribute DB 112 stores various presence attributes, for example, friend list information of a corresponding client terminal 10, and status, address and contact information of individual friends contained in the friend list, etc. The presence attributes are various data stored in the client terminal 10 and the server 110 to establish a messenger service. The client terminal 10 gains access to the server 110, requests presence attributes from the server 110 to receive the messenger service, and receives the presence attributes from the server 110.

FIG. 2 depicts a conventional process for synchronizing presence attribute data between the client terminal 10 and the server 110.

Referring to FIG. 2, upon receiving a messenger service request command from a user, the client terminal 10 transmits a login request signal to the server 110 at step 204. The server 110 having received the login request signal recognizes the client terminal 16 having transmitted the login request signal, and transmits a response signal (not shown) to the login request signal to the client terminal 10, such that user service information and client terminal 10's information can be transmitted between the client terminal 10 and the server 110. Thereafter, the client terminal 10 requests presence attributes from the server 110, and the server 110 reads presence attributes at step 206 of the client terminal 10 from the presence attribute DB 112, and transmits at step 208 the read presence attributes to the client terminal 10.

For example, if a call connection state between the server 110 and the client terminal 10 is completed at 3 o'clock, and the client terminal 10 re-accesses the server 110 at 4 o'clock, there is no way to verify the presence attributes of the client terminal 10 during the time between 3 o'clock and 4 o'clock, such that the server 110 must verify all data of the client terminal 10. Due to this problem, the server 110 must unnecessarily verify even that data which was unchanged during the one hour. In more detail, if the client terminal 10 is disconnected from the server 110 at 3 o'clock, and is connected to the server 110 at 4 o'clock, the client terminal 10 must request all the presence attributes from the server 110, and thereby the server 110 must unavoidably transmit the same presence attributes as those at 3 o'clock to the client terminal 10 even though the client terminal 10's presence attributes stored in the server 110 are the same at 3 and 4 o'clock. In the case where a small amount of update attributes are contained in the presence attributes associated with the client terminal 10 at 3 and 4 o'clock, the server 110 must transmit all the presence attributes to the client terminal 10, such that the amount of traffic is increased and a long period of time is consumed due to such unnecessary data transmission.

As stated above, the client terminal 10 requests all of its own presence attributes from the server 110 whenever it gains access to the server 110, and receives the requested presence attributes from the server 110 in such a way that the client terminal 10 updates its own presence attributes. For example, if specific presence attributes generated when the client terminal 10 is disconnected from the server 110 are equal to those generated when the client terminal is reconnected to the server 110, or if a small amount of updated presence attributes are provided, the server 110 must transmit all the presence attributes to the client terminal 10, such that unnecessary traffic and time are consumed.

SUMMARY OF THE INVENTION

Therefore, the present invention has been made in view of the above problems, and it is an object of the present invention to provide an apparatus and method for controlling a server to limit the transmission of presence attribute data to only that presence attribute data that needs to be updated to a client terminal when the client terminal is reconnected to the server, resulting in more effective data synchronization.

It is another object of the present invention to provide an apparatus and method for controlling the server to limit the transmission of presence attribute data to only that presence attribute data that needs to be updated to the client terminal when the client terminal is reconnected to the server, thereby preventing traffic from being increased due to unnecessary data transmission.

It is yet another object of the present invention to provide an apparatus and method for controlling the client terminal to receive only that presence attribute data that needs to be updated from the server when the client terminal is reconnected to the server, thereby changing current presence attribute data to effective or valid data within a short period of time.

In accordance with one aspect of the present invention, the above and other objects can be accomplished by the provision of an apparatus for providing a messenger service, comprising: a client terminal for requesting presence attribute data to be updated from a server when it is reconnected to the server having been previously connected to the client terminal to perform the messenger service, and updating presence attribute data stored during a previous connection upon receiving the presence attribute data to be updated from the server; and a server for receiving a presence attribute data request to be updated from the client terminal, and transmitting only updated presence attribute data, created after releasing the previous connection, from among current presence attribute data to the client terminal.

In accordance with another aspect of the present invention, there is provided a method for synchronizing presence attribute data between a client terminal and a server in an apparatus composed of the client terminal and the server providing the client terminal with a messenger service, comprising the steps of: if the client terminal is reconnected to the server having been previously connected to the client terminal to perform the messenger service, controlling the client terminal to request presence attribute data to be updated from the server; upon receiving a presence attribute data request to be updated from the client terminal, controlling the server to transmit only updated presence attribute data, created after releasing the previous connection, from among current presence attribute data to the client terminal; and controlling the client terminal to update presence attribute data stored at a time of a previous connection upon receiving presence attribute data to be updated from the server.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
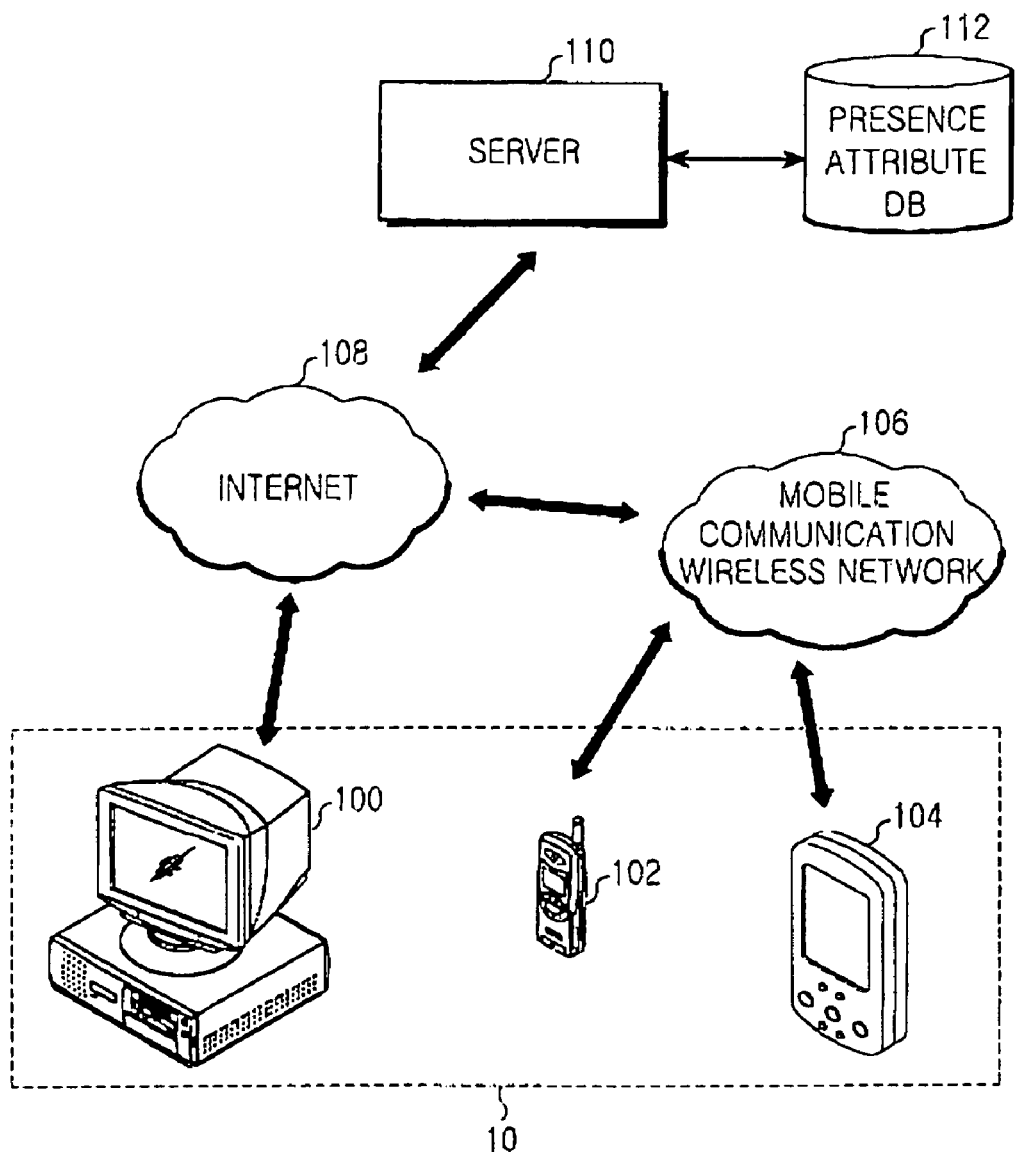
FIG. 1 is a block diagram illustrating a conventional system for establishing communication between a client terminal and a server.
Figure 2:
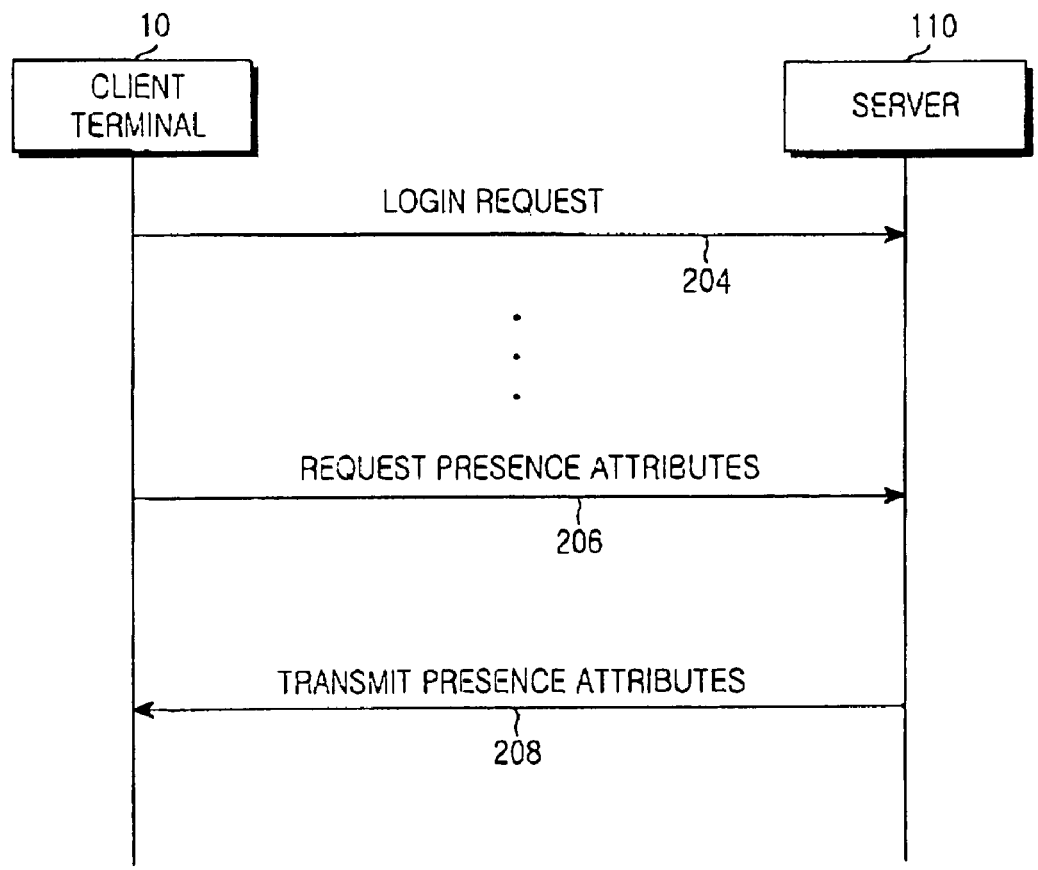
FIG. 2 is a flow chart illustrating a conventional process for synchronizing presence attribute data between the client terminal and the server shown in FIG. 1.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

At the moment of disconnecting a client terminal 10 from a server 110, the server 110 and the client terminal 10 store the same data therein. If data is created and stored when the server 110 is disconnected from the client terminal 10, and then the server 110 is reconnected to the client terminal 10 using a specific key value for identifying the data, the client terminal 10 transmits only the specific key value to the server 110, and the server 110 receives the specific key value from the client terminal 10. In this case, provided that the same key value as the specific key value and data corresponding to the key value are stored in the server, the server 110 transmits the data that needs to be updated to the client terminal 10.

An apparatus for establishing communication between the client terminal 10 and the server 110 according to an embodiment of the present invention will hereinafter be described with reference to FIG. 1.

The client terminal 10 includes all the terminals capable of providing a messenger service, for example, a computer 100, a mobile phone or terminal 102, and a PDA (Personal Digital Assistant) 104, etc. If the client terminal 10 is disconnected from the server 110, it stores presence attribute data, such as a friend list data and friend condition data, etc., created during the last communication between the client terminal 10 and the server 110. The client terminal 10 stores a unique session ID of a previous session between the client terminal 10 and the server 110, a client ID of the client terminal 10 storing the friend list and condition data, and a transaction ID between the client terminal 10 and the server 110. In this case, the transaction designates a response of a server 110 to a request of a client terminal 10, or a response from a client terminal 10 to a request by a server. Whenever a session between the server 110 and the client terminal 10 is established, a unique transaction ID is assigned to either the client terminal 10 or the server 110. In this case, during a communication time between the server 110 and the client terminal 10, the client terminal 10 stores a normally-completed transaction ID generated when request and response operations between the server 110 and the client terminal 10 are all normally completed.

In the case of reconnecting the client terminal 10 to the server 110, the client terminal 10 creates a key composed of such a session ID, a client ID of the client terminal 10, and a transaction ID corresponding to the last communication with the server 110, and transmits the created key to the server 110.

The server 110 connected to the client terminal 10 over the Internet provides the client terminal 10 with a messenger service when it receives a messenger service request from the client terminal 10.

The server 110 stores data for providing individual client terminals 10 with a messenger service in the presence attribute DB 112. The server 110 transmits presence attribute data, for example, an ID and password of a user, a client ID of the client terminal 10, a friend list defined by a session ID indicative of a connection state with the client terminal 10, and a friend condition, etc., created during the last communication associated with the client terminal 10 in the presence attribute DB 112. The server 110 stores various data, for example, a session ID equal to the last session ID created before it is connected to the client terminal 10, a client ID of the client terminal 10 storing the friend list and condition information, and the last transaction ID of a predetermined transaction normally completed while it communicates with the client terminal 10, in the presence attribute DB 112. Upon receiving a re-access request from the client terminal 10, the server 110 determines whether key values stored in the presence attribute DB 112 are equal to the session ID stored in the received re-access request, the client ID of the client terminal 10, and the transaction ID corresponding to the last communication with the server 110.

If the presence attribute DB 112 stores the same key value as a key value created when the client terminal 10 is reconnected to the server 110, the server 110 compares presence attribute data with the last valid presence attribute data stored in the presence attribute DB 112 according to the same key value at a time of a connection release between the server 110 and the client terminal 10, and reads a different field between both presence attribute data. The server 110 inserts the different field in a response data field of the presence attribute request, and transmits it to the client terminal 10. In this case, if there is no update information between current presence attribute data and previous presence attribute data stored in response to the same key value, the server 110 transmits the response data field with the null status. After presence attribute data of the server 110 is synchronized with that of the client terminal 10, the server 110 may delete the key value used for such synchronization and presence attribute data corresponding to the key value.

If the presence attribute DB 112 does not store the same key value as a key value created at a re-access time between the server 110 and the client terminal 10, the server 110 transmits a specific message indicative of a presence attribute synchronization failure to the client terminal 10. The client terminal 10 receiving the message deletes its own stored key and associated data because they are no longer effective. The client terminal 10 requests presence attributes from the server 110 using a general presence synchronization process, receives all the current presence attributes from the server 110, updates the received presence attributes, and synchronizes them with the server 110.

The above method for synchronizing presence attribute data at a re-access time between the client terminal 10 and the server 110 will hereinafter be described with reference to FIG. 3.

If the client terminal 10 is connected to the server 110, the client terminal 10 and the server 110 share a session ID and a client ID associated with such connection. In this case, if the client terminal 10 is disconnected from the server 110, the client terminal 10 and the server 110 each store a successful transaction ID created during the last communication between them. If the client terminal 10 is normally disconnected from the server 110, the transaction ID stored in the client terminal 10 and the server 110 adapts a logout request or a connection end request as the last successful transaction. Otherwise, if the client terminal 10 is abnormally disconnected from the server 110, a transaction just before the moment of a connection failure is adapted as the last successful transaction. According to the present invention, it is assumed that the client terminal 10 and the server 110 each share presence attribute data, and are then disconnected from each other. If the client terminal 10 and the server 110 are disconnected from each other, the client terminal 10 and the server 110 each create a synchronization key for synchronizing presence attribute data composed of a session ID, a client ID, and a transaction ID, and store the created synchronization key. The client terminal 10 and the server 110 store such a synchronization key and presence attribute data.

If the client terminal 10 transmits a re-access or login request to the server 110 at step 300 after being disconnected from the server 110, the server 110 recognizes the client terminal 10 transmitting the re-access request, and transmits a response signal to the re-access request to the client terminal 10, such that user service information and the client terminal 10 information are communicated between the client terminal 10 and the server 110. Thereafter, at step 304, the client terminal 10 transmits a predetermined message determining whether the server 110 provides a specific service for synchronizing presence attributes using the above synchronization key (i.e., synckey) to the server 110. If it is determined that the server 110 provides the specific service for synchronizing the presence attributes using the synchronization key, the server 110 transmits a predetermined response message to the client terminal 10 at step 306.

If the client terminal 10 receives a response message to a presence attribute synchronization service request at step 306, it requests at step 308 the presence attribute data from the server 110. In this case, the client terminal 10 transmits the synchronization key (synckey) to synchronize presence attribute data composed of a session ID, a client ID, and a transaction ID in such a way that it requests presence attributes from the server 110.

The server 110 determines at step 310 whether the same synchronization key (synckey) as the synchronization key (synckey) received from the client terminal 10 is stored in the presence attribute DB 12. If it is determined that the same synchronization key (synckey) is stored in the presence attribute DB 112, the server 110 goes to step 314. Otherwise, if the same synchronization key (synckey) is not stored in the presence attribute DB 112, the server 110 transmits at step 312 a specific message indicative of a presence attribute synchronization failure to the client terminal 10. The client terminal 10 receiving the message deletes its own stored key and associated data because they are no longer effective. The client terminal 10 requests presence attributes from the server 110 using a general presence synchronization process, receives all the current presence attributes of friends contained in the user's friend list from the server 110, updates the received presence attributes, and synchronizes them with the server 110.

If it is determined in step 310 that the same key value as the key value received from the client terminal 10 is stored in the presence attribute DB 112, the server 110 at step 314 compares presence attribute data indicative of the current condition of the current presence attribute data with the last valid presence attribute data stored in the presence attribute DB 112 according to the same key value at a time of a connection release between the server 110 and the client terminal 10, and reads an updated field between both presence attribute data. The server 110 inserts the updated field in a response data field of the presence attribute request, and transmits it to the client terminal 10 at step 316. In this case, if there is no update information between current presence attribute data and previous presence attribute data stored in response to the same key value, the server 110 transmits the response data field with the null status. After presence attribute data of the server 110 is synchronized with that of the client terminal 10, the server 110 may delete the key value used for such synchronization and presence attribute data corresponding to the key value.

Figure 3:
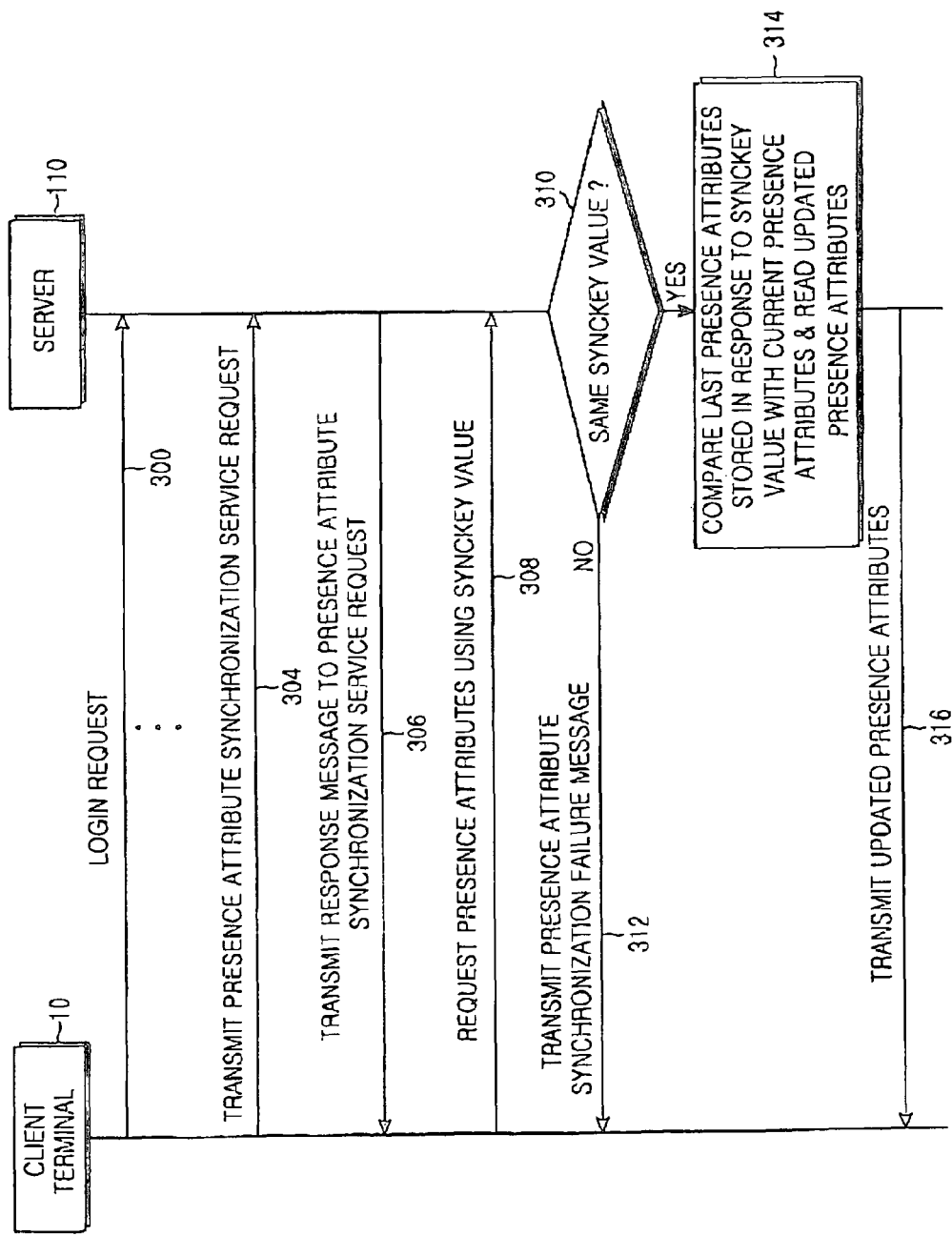
FIG. 3 is a flow chart illustrating a process for synchronizing presence attribute data between a client terminal and a server in accordance with a preferred embodiment of the present invention.

As shown in FIG. 3, in the case of reconnecting the client terminal 10 to the server 110 using the synchronization key value to synchronize presence attributes of the client terminal with those of the server 110, the server 110 may select only current updated presence attributes from among all presence attributes stored at a time of a connection release, and may transmit the selected presence attributes to the client terminal 10.

Figure 4:
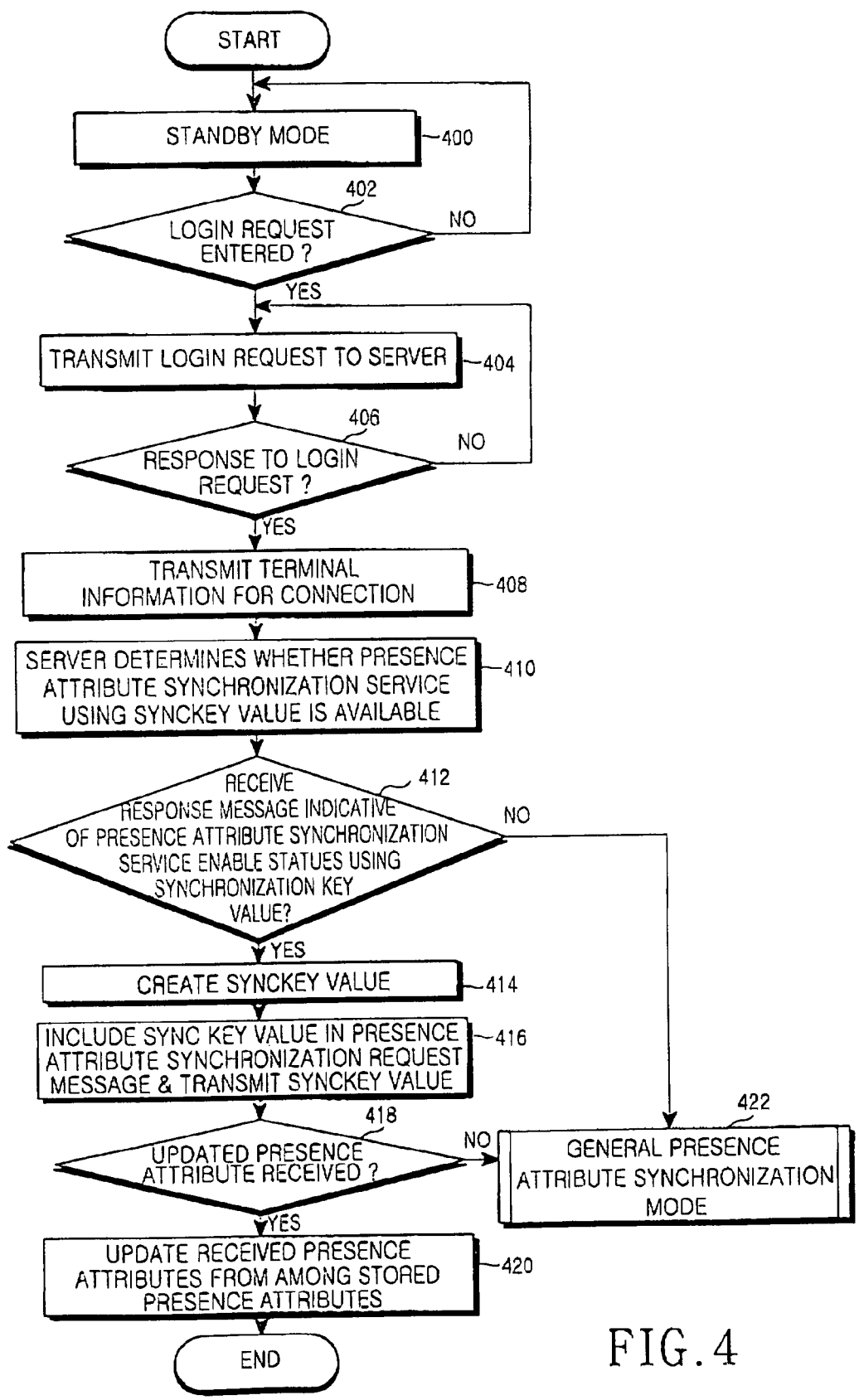
FIG. 4 is a flow chart illustrating a process for controlling the client terminal to synchronize its presence attribute data with the server in accordance with a preferred embodiment of the present invention.

A method for controlling the client terminal 10 to synchronize its presence attribute data with that of the server 110 will hereinafter be described with reference to FIG. 4. FIG. 4 is a flow chart illustrating a process for controlling the client terminal 10 to synchronize its presence attribute data with the server 110 in accordance with a preferred embodiment of the present invention.

Referring to FIG. 4, if a process goes from step 400 indicative of a standby mode to step 402 and a user enters a login request to the server 110 to receive a messenger service at step 402, the client terminal 10 transmits the login request to the server 110 at step 404. If the client terminal 10 receives a response message to the login request from the server 110 at step 406, user service information and the client terminal 10's information are transmitted to the server 110 at step 408. The client terminal 10 transmits a prescribed request to the server 110 such that the server 110 determines whether a presence attribute synchronization service function can be executed or not using the synchronization key (synckey) value at step 410. If the client terminal 10 receives a response message indicating that the presence attribute synchronization service function can be executed using the synchronization key (synckey) value at step 412 from the server at step 412, it goes to step 414. Otherwise, if the client terminal 10 does not receive the response message at step 412, it performs a general presence synchronization process at step 422. During the general presence synchronization process, the client terminal 10 requests presence attributes from the server 110, receives all the current presence attributes from the server 110, updates the received presence attributes, and synchronizes them with the server 110.

After performing the above step 412, the client terminal 10 creates a synchronization key (synckey) composed of a session ID, a client ID, and a transaction ID at step 414, includes the created synchronization key (synckey) in a presence attribute synchronization request message, and transmits the presence attribute synchronization request message to the server 110 at step 416. Upon receiving presence attribute data to be updated from the server 110 at step 418, the client terminal 10 at step 420 updates only the received presence attributes from among the stored presence attributes, and stores the updated presence attributes. If no updated presence attribute data is received at step 418, the client terminal 10 performs a general presence attribute synchronization at step 422.

Figure 5:
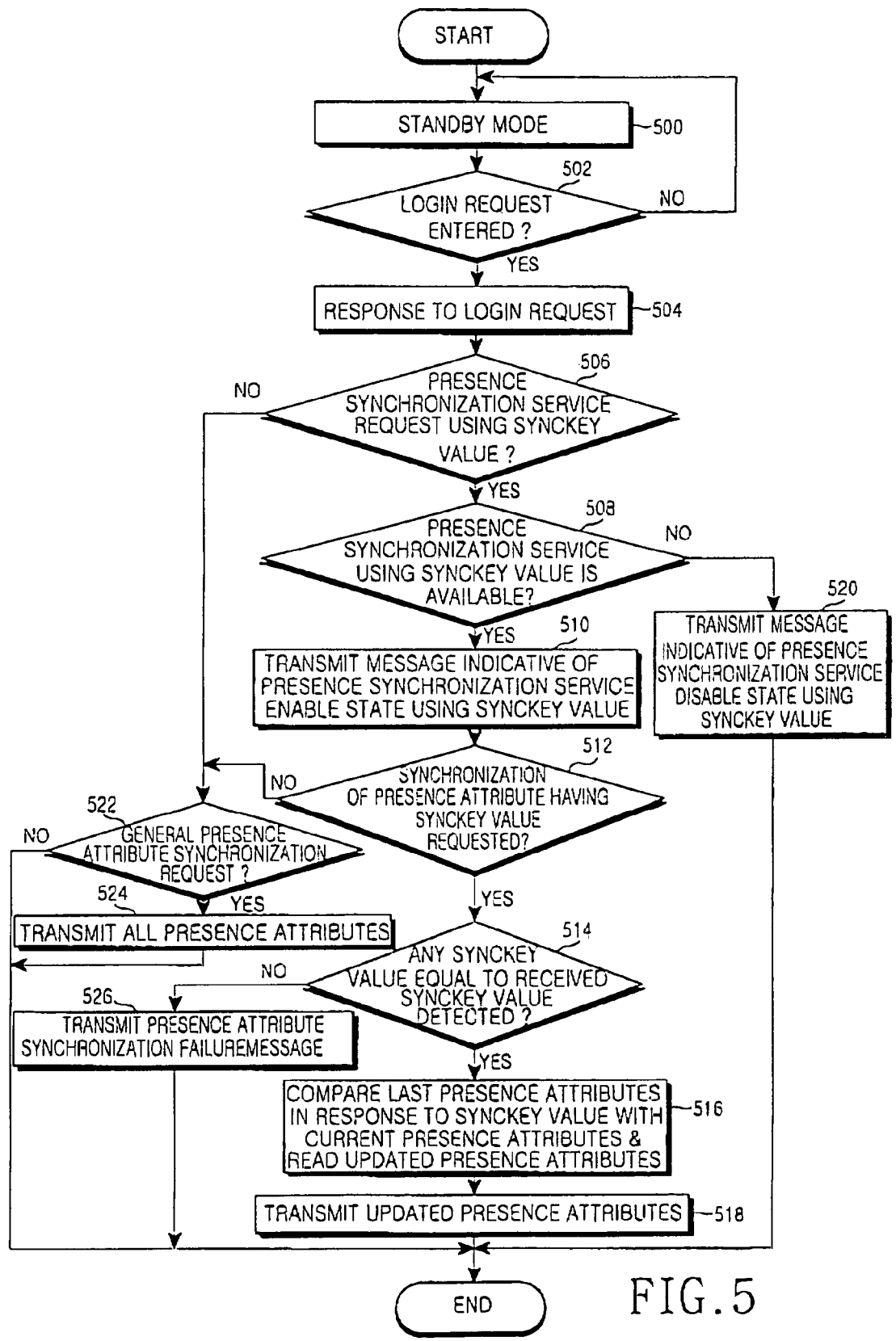
FIG. 5 is a flow chart illustrating a process for controlling the server to synchronize its presence attribute data with the client terminal in accordance with a preferred embodiment of the present invention.

If the client terminal 10 requests presence attributes from the server 110 using the synchronization key value, the server 110 transmits presence attributes to the client terminal 10 such that presence attributes of the server 110 are synchronized with those of the client terminal 10, its detailed description will hereinafter be described with reference to FIG. 5. FIG. 5 is a flow chart illustrating a process for controlling the server 110 to synchronize its presence attribute data with the client terminal 10 in accordance with a preferred embodiment of the present invention.

Referring to FIG. 5, the server 110 determines at step 502 whether a login request is received from the client terminal 10 while maintaining a standby mode at step 500. Upon receiving the login request from the client terminal 10, the server 110 transmits a response message to the login request at step 504. If the server 110 receives a prescribed request from the client terminal 10 to determine whether a presence attribute synchronization service can be executed using a synchronization key (synckey) value at step 506, the process goes to step 508. Otherwise, if the server 110 does not receive the prescribed request from the client terminal 10 at step 506, the process goes to step 522. If the server 110 goes to step 508, it determines whether a presence attribute synchronization service can be executed using the synchronization key (synckey) value at step 508. If it is determined that the presence attribute synchronization service can be executed at step 508, the server goes to step 510. Otherwise, if it is determined that the presence attribute synchronization cannot be executed at step 508, the server 110 goes to step 520, such that at step 520 it transmits a prescribed message indicating that it is impossible to perform the presence attribute synchronization service using the synchronization key value to the client terminal 10, and terminates overall processes. If it is determined that the presence attribute synchronization service can be executed using the synchronization key value at step 508, the server 110 transmits at step 510 a response message to the request for checking the presence attribute synchronization service enable status to the client terminal 10. If the client terminal 10 requests presence attributes containing the synchronization key value from the server 110 at step 512, the server 110 determines whether a synchronization key value equal to a reception synchronization key value is stored in the presence attribute DB 112 at step 514. If the values are not equal, a synchronization failure message is sent in step 526. If it is determined that the same synchronization key value as the reception synchronization key value is found at step 514, the server 110 at step 516 compares current presence attributes with the last presence attributes in response to the synchronization key value, and reads updated presence attributes. The server 110 transmits presence attribute data to be updated to the client terminal 10 at step 518. The server 110 compares presence attribute data with the last valid presence attribute data stored in response to the same key value at a time of a connection release between the server 110 and the client terminal 10, and reads an updated field between both presence attribute data. For example, provided that a connection release between the server 110 and the client terminal 10 occurs on the condition that three friends are in an online status and the remaining friends other than the three friends are in an offline status, the client terminal 10 and the server 110 store presence attribute data at a time of the connection release, and store a synchronization key value composed of a client ID, a session ID, and a transaction ID. The client terminal 10 inserts a synchronization key value in the presence attributes when it is reconnected to the server 110, and requests presence attributes from the server 110. If a connection release between the server 110 and the client terminal 10 occurs, the server 110 receiving the presence attributes compares current friend status with a specific status in which three friends contained in the friend list serving as stored presence attributes is in the online mode and the remaining friends other than the three friends are in the offline mode. In more detail, if a connection release between the server 110 and the client terminal 10 occurs, the server 110 determines whether an online friend has changed to an offline friend, and determines whether status information (e.g., an ID and an address, etc.) has changed to other information in such a way that it transmits only changed information to the client terminal 10. However, if such a connection release between the server 110 and the client terminal 10 occurs, and there is no update information between the stored presence attributes and new presence attributes created at a re-connection time between the server 110 and the client terminal 10, the server 110 transmits data indicative of a null status to a response data field such that it informs the client terminal 10 of no updated presence attributes. If a synchronization process is completed, the server 110 may delete any used synchronization key value and its associated presence attribute data.

After performing steps 506 and 512 and a "no" is determined, the server 110 determines whether a general presence attribute synchronization request is received from the client terminal 10 at step 522. If it is determined that the client terminal 10 transmits the general presence attribute synchronization request, the server 110 transmits at step 524 all the current presence attribute data to the client terminal 10, and terminates overall operations.

As described above, if the client terminal 10 is reconnected to the server 10 to perform a messenger service, the inventive apparatus receives not all the presence attributes but only updated presence attributes from among presence attributes stored at a time of a connection release, such that it can quickly synchronize the client terminal 10 with the server 110 at a connection moment between the client terminal 10 and the server 110, and can reduce the amount of traffic due to transmission/reception of the small amount of data.

As apparent from the above description, if the client terminal is reconnected to the server, there is no need for the client terminal and the server to mutually exchange specific data that need not be synchronized with the server, resulting in reduction of the amount of transmission data between the client terminal and the server. Furthermore, if the client terminal is connected to the server, current status data of friends contained in the user's friend list can be changed to effective or valid data within a short period of time, resulting in a reduced synchronization time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for updating a presence attribute data in a client terminal, having a messenger service, comprising the steps of:
   reading a session IDentification (ID), which is an ID of a previous session between the client terminal and a server;
   reading a client ID for identifying the client terminal;
   reading a transaction ID, which designates between the client terminal and the server before a termination of a previous connection;
   generating a synchronization key having the session ID, the client ID, and the transaction ID, the synchronization key for requesting, from the server after the termination of the previous connection between the client terminal and the server, only presence attribute data updated after the termination of the previous connection; and
   transmitting the generated synchronization key to the server.

2. The method as claimed in claim 1, wherein the transaction ID is generated according to a last response of the server for a request of a client terminal.

3. The method as claimed in claim 1, wherein the presence attribute data includes at least one of a list of friends, statuses of the friends, addresses of the friends and contact information of the friends, and
   wherein the presence attribute data is stored in the client terminal for a messenger service.

4. The method as claimed in claim 1, further comprising whenever a session between the server and the client terminal is established, updating the presence attribute data, the session ID, the client ID, and the transaction ID.

5. A method for sending a presence attribute data for providing a messenger service in a server, comprising the steps of:
   receiving a presence synchronization request from a client terminal, the presence synchronization request having a previous session IDentification (ID), a client ID, and a transaction ID;
   identifying the received presence synchronization request;
   identifying whether the client terminal was previously connected to the server to perform the messenger service according to the received presence synchronization request;
   if the client terminal is a previous client terminal used for a previous connection, checking presence attribute data updated after a termination of the previous connection between the client terminal and the server, wherein the updated presence attribute data is requested from the client terminal using the previous session ID according to the client ID and the transaction ID; and
   transmitting the updated presence attribute data updated after the termination of the previous connection to the client terminal, wherein the transmitted updated presence attribute data does not include presence attribute data updated before the termination of the previous connection.

6. The method as claimed in claim 5, further comprising identifying the client ID from the received presence synchronization request, wherein the client ID is a unique ID of the client terminal.

7. The method as claimed in claim 5, further comprising identifying the transaction ID from the received presence synchronization request, wherein the transaction ID is designated between the client terminal and the server before a termination of the previous connection.

8. The method as claimed in claim 5, wherein transmitting the updated presence attribute data to the client terminal includes:
   identifying the previous session ID, the client ID, and the transaction ID from the received presence attribute data request; and
   transmitting the updated presence attribute data to the client terminal corresponding to the identified previous session ID, the identified client ID and the identified transaction ID, using the session ID, the client ID, and the transaction ID, wherein the updated presence attribute data is transmitted to the client terminal after a termination of the previous connection.

9. A client terminal for updating presence attribute data for a messenger service, the client terminal comprising:
   a processor for reading a previous session IDentification (ID) between the client terminal and a server before a reconnection to the server, reading a client ID, which is a particular ID of the client terminal, reading a transaction ID which designates between the client terminal and the server before a termination of a previous connection, and generating a synchronization key by using session ID, the client ID and the transaction ID, the synchronization key for requesting, from the server, only presence attribute data updated after a termination of the previous connection between the client terminal and the server; and
   a transmitter for transmitting the generated synchronization key to the server.

10. The client terminal as claimed in claim 9, wherein the transaction ID is generated according to a last response, of the server, to a request of a client terminal.

11. The client terminal as claimed in claim 9, further comprising a memory for storing presence attribute data having a list of friends, statuses of the friends, addresses of the friends, and contact information of the friends for operating a messenger service.

12. The client terminal as claimed in claim 11, wherein the memory stores the previous session ID, the client ID, and the transaction ID.

13. The client terminal as claimed in claim 9, wherein whenever a session between the server and the client terminal is established, the processor updates the presence attribute data, the session ID, the client ID, and the transaction ID.

14. A server for transmitting presence attribute data for messenger service to a client terminal, the server comprising:
   a receiver for receiving a presence synchronization request from a client terminal, the presence synchronization request having a previous session IDentification (ID), a client ID, and a transaction ID;
   a processor for identifying the received presence synchronization request, identifying whether the client terminal was previously connected to the server to perform the messenger service based on the received presence synchronization request, and, if the client terminal is a previous client terminal used for a previous connection, checking presence attribute data updated after a termination of the previous connection between the client terminal and the server, wherein the updated presence attribute data is requested from the client terminal using the previous connection according to the session ID, the client ID, and the transaction ID; and a transmitter for transmitting the updated presence attribute data to the client terminal, wherein the transmitted updated presence attribute data does not include presence attribute data updated before the termination of the previous connection.

15. The server as claimed in claim 14, wherein the server identifies the client ID from the received presence synchronization request, the client ID being a unique ID of the client terminal.

16. The server as claimed in claim 14, wherein the server identifies the transaction ID from the received presence synchronization request, the transaction ID being designated between the client terminal and the server before a termination of the previous connection.

17. The server as claimed in claim 14, wherein the processor identifies the previous session ID, the client ID, and the transaction ID from the received presence synchronization request, and wherein the transmitter transmits the updated presence attribute data to the client terminal corresponding to the identified previous session ID, the identified client ID, and the identified transaction ID, the updated presence attribute data being transmitted to the client terminal after a termination of the previous connection.

18. The method as claimed in claim 1, further comprising step of receiving the attribute data updated after a previous connection between the client terminal and the server if the transmitted synchronization key is the same as a previous synchronization key stored in the server.

19. The method as claimed in claim 1, wherein, in receiving the updated presence attribute data from the server, the client terminal does not receive presence attribute data that has not been updated after the previous connection between the client terminal and the server.

20. The method as claimed in claim 5, wherein the previous session ID is an ID of a previous session between the client terminal and the server.

21. The method as claimed in claim 5, wherein the transaction ID is an ID which designates the server's response to the client terminal's request, or the client terminal's response to the server's request between the client terminal and the server before a termination of a previous connection.

22. The client terminal as claimed in claim 9, wherein the transmitter receives, from the server, presence attribute data updated after a previous connection between the client terminal and the server, if the transmitted synchronization key is the same as a previous synchronization key stored in the server.

23. The client terminal as claimed in claim 9, wherein, in receiving the updated presence attribute data from the server, the client terminal does not receive presence attribute data that has not been updated after the previous connection between the client terminal and the server.

24. The server as claimed in claim 14, wherein the previous session ID is an ID of a previous session between the client terminal and the server.

25. The server as claimed in claim 14, wherein the transaction ID is an ID which designates the server's response to the client terminal's request, or the client terminal's response to the server's request between the client terminal and the server before a termination of a previous connection.

* * * * *